United States Patent [19]
Kil

[11] Patent Number: 6,022,139
[45] Date of Patent: Feb. 8, 2000

[54] OIL TEMPERATURE DETECTING SYSTEM AND METHOD FOR AUTOMATIC TRANSMISSIONS

[75] Inventor: Sunghong Kil, Seoul, Rep. of Korea

[73] Assignee: Hyundai Motor Company, Seoul, Rep. of Korea

[21] Appl. No.: 08/996,340

[22] Filed: Dec. 22, 1997

[51] Int. Cl.[7] ............................ G01K 1/08; B60K 41/04; F16H 61/26
[52] U.S. Cl. ...................... 374/142; 477/115; 477/131; 477/138
[58] Field of Search ...................... 374/141, 142, 374/144; 73/118.1; 364/424.1, 424.05; 477/72, 76, 97, 98, 115, 127, 130, 131, 138, 139

[56] References Cited

U.S. PATENT DOCUMENTS

| | | | |
|---|---|---|---|
| 5,251,091 | 10/1993 | Ito et al. | 361/152 |
| 5,335,565 | 8/1994 | Ito et al. | 477/131 |

*Primary Examiner*—Vit Miska

[57] ABSTRACT

In the oil temperature detecting method, an oil temperature sensor detects the temperature of oil in an automatic transmission. A controller receives the detected temperature and signals indicating a first and second potential. The first potential represents the ground potential of the automatic transmission, and the second potential represents the ground potential of a body of the vehicle. Based on the first and second potentials and the sensed oil temperature, the controller controls an operation of the automatic transmission.

12 Claims, 2 Drawing Sheets

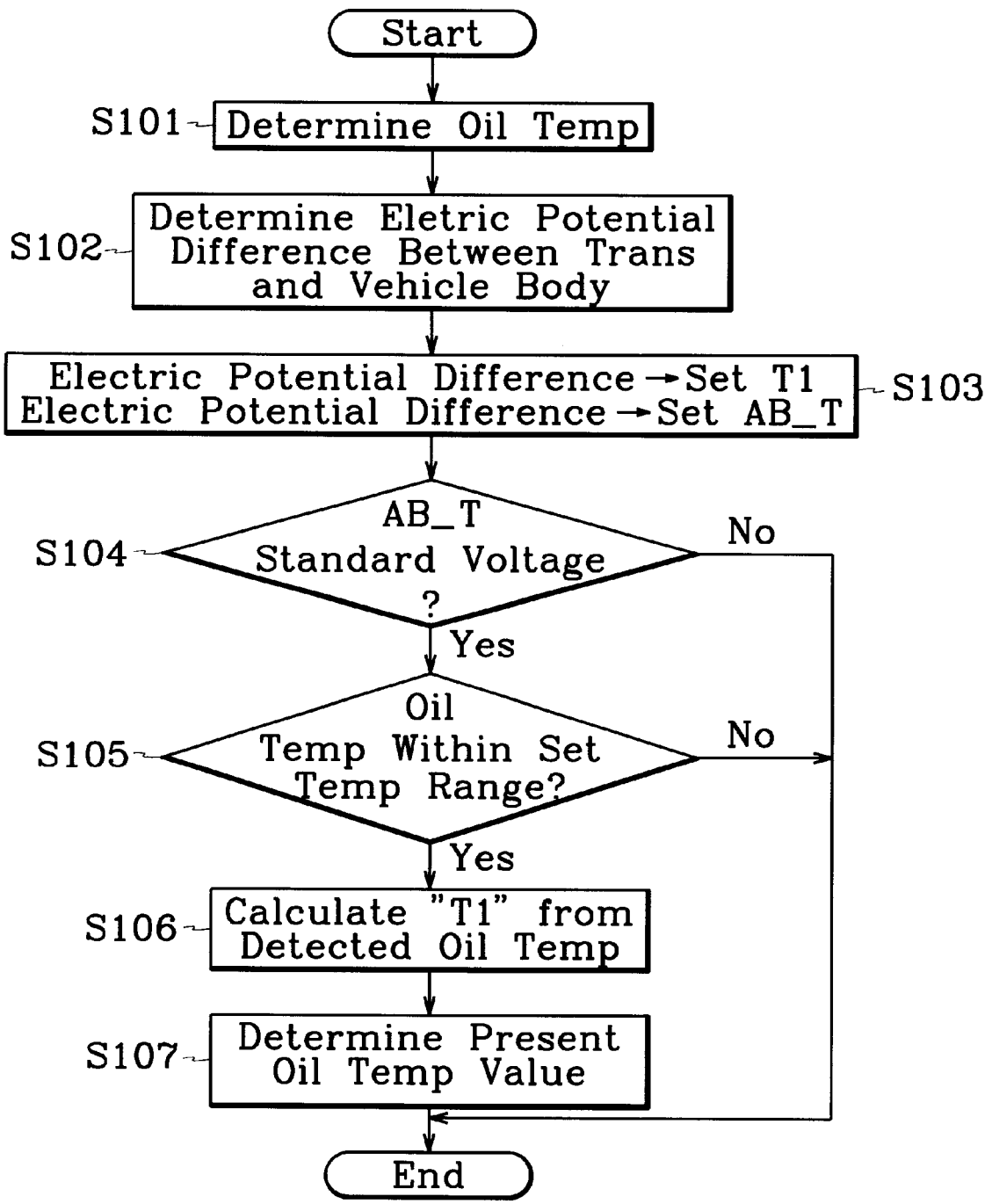

OIL TEMPERATURE DETECTING SYSTEM AND METHOD FOR AUTOMATIC TRANSMISSIONS

FIELD OF THE INVENTION

The present invention relates to an oil temperature detecting system and method for automatic transmissions, and more particularly, to an oil temperature detecting system and method which compensates for errors in oil temperature sensor readings caused by a difference in electric potential between an automatic transmission and a vehicle body.

BACKGROUND OF THE INVENTION

Generally, a transmission control unit (TCU) controls all operations of an automatic transmission's shifting by controlling the operation of valves selectively communicating lines to control the flow of hydraulic pressure.

Solenoid valves are connected to the valves to control the opening and closing of the same such that hydraulic pressure flow and levels can be precisely controlled.

Because viscosity of oil used in the transmission undergoes changes according to temperature fluctuations, it is possible for the pressure of the oil to be different from that intended by control of the solenoid valves.

Accordingly, transmissions use oil temperature sensors to enable the TCU to adjust electrical current levels applied to the solenoid valves according to the detected temperature. This allows hydraulic pressure levels to be precisely controlled by compensating for temperature changes such that precise shift timing and a high level of shift quality can be maintained.

So, for example, if oil viscosity is increased as a result of a reduction in oil temperature, the TCU controls the amount of electrical current applied to the solenoid valves such that hydraulic pressure levels can be adjusted to compensate for the reduction in the flow of oil caused by an increase in viscosity.

In the above prior art system for detecting oil temperature in the automatic transmission, analog signals output from the oil temperature sensor, which is provided in the automatic transmission (the automatic transmission being grounded to the vehicle body), are converted to digital signals by an analog/digital (A/D) converter. Then, a method is used in which a microprocessor recognizes the digital signals.

However, in the prior art oil temperature detecting system it is possible for a difference in electric potential to occur in the ground of the transmission and vehicle body, especially in older vehicles. To remedy this, a cable is used in the prior art to connect the vehicle body to the automatic transmission. But short-circuiting and disconnection problems often occur in the cable such that the ground potential becomes different between the transmission and vehicle body. In either case, errors in the signal output from the oil temperature sensor result.

Accordingly, these errors in the oil temperature signals cause the TCU to incorrectly compensate for changes in oil viscosity such that shift shock is generated.

SUMMARY OF THE INVENTION

The present invention has been made in an effort to solve the above problems.

It is an object of the present invention to provide an oil temperature detecting system and method for automatic transmissions which simultaneously detects oil temperature and a ground level of an automatic transmission to adjust a signal output from an oil temperature sensor according to a difference in ground levels between the transmission and vehicle body such that compensation in hydraulic pressure levels needed for changes in oil temperature can be precisely performed.

To achieve the above object, the present invention provides an oil temperature detecting system an oil temperature detecting system including a shift control portion including an A/D converter, which converts analog signals output from various sensors to digital signals, and a microprocessor, which analyzes drive information output from the A/D converter and controls operations for shift control according to a program installed in the microprocessor; an oil temperature sensor installed in an automatic transmission that detects oil temperature and outputs corresponding electronic signals to the A/D converter of the shift control portion; a ground cable connecting a vehicle body ground of the automatic transmission to a vehicle body and an attaching cable connecting the A/D converter 12 to the ground cable.

An oil temperature detecting method comprising the steps of determining oil temperature from signals output from the oil temperature sensor, determining a difference in electric potential between automatic transmission and vehicle body grounds, determining whether detected oil temperature is within an established standard range if the electric potential difference is above a standard voltage, calculating present oil temperature and electric potential difference between the automatic transmission and vehicle body grounds if the oil temperature is within the predetermined range.

If it is determined the electric potential difference is below the standard voltage, the signal from the oil temperature sensor is used as the present oil temperature value.

If the detected oil temperature is above a standard temperature, the signal from the oil temperature sensor is used as the present oil temperature value.

The temperature range is set at low temperatures of between 0° C. and 80° C.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 2 is a flow chart of an oil temperature detecting method according to a preferred embodiment of the present invention.

DETAILED DESCRIPTION OF THE PREFFERED EMBODIMENT

Figure 1:
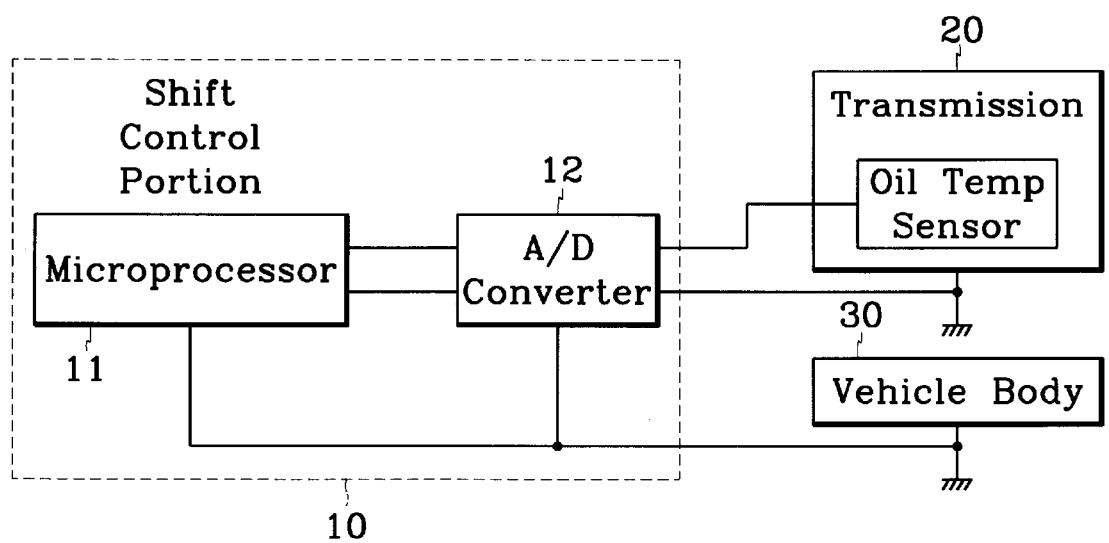
FIG. 1 is a block diagram of an oil temperature detecting system according to a preferred embodiment of the present invention.

A Preferred embodiment of the present invention will now be described in detail with reference to the accompanying drawings.

Referring first to FIG. 1, shown is a block diagram of an oil temperature detecting system according to a preferred embodiment of the present invention.

The inventive oil temperature detecting system comprises a shift control portion 10. The shift control portion 10 includes an A/D converter 12, which converts analog signals output from various sensors to digital signals, and a microprocessor 11, which analyzes drive information output from the A/D converter 12 and controls shifting of the automatic transmission according to a program installed in the microprocessor 11. An oil temperature sensor 21 is installed in an automatic transmission 20, detects oil temperature, and outputs corresponding electronic signals to the A/D converter 12 of the shift control portion 10. Here, the A/D converter 12 is connected to a predetermined point on a cable connecting a vehicle body ground to a vehicle body 30 through an attaching cable.

Referring now to FIG. 2, shown is a flow chart of an oil temperature detecting method of the oil temperature detecting system structured as in the above.

In the drawing, when the vehicle is started, the microprocessor 11 of the shift control portion 10 reads analog signals output from the oil temperature sensor 21 and converts the analog signals to digital signals in the A/D converter 12 (S1O1). At the same time, the shift control portion 10 determines a difference in electric potential between the grounds of the transmission 20 and vehicle body 30 (S102).

Next, the microprocessor 11 of the shift control portion 10 establishes a value T1 of the electric potential difference between the automatic transmission and vehicle body grounds, and sets an absolute value AB__T for the electric potential difference (S103).

Next, after establishing the electric potential difference between the grounds of the automatic transmission 20 and vehicle body 30, it is determined if the absolute value is above a standard voltage (S104).

If the absolute value is above the standard voltage, it is determined if the detected oil temperature is within a predetermined temperature range (S105).

If the oil temperature is within the predetermined range, it is determined that the vehicle has been sufficiently warmed up and an electric potential value between the automatic transmission and vehicle body grounds is then calculated from the above detected oil temperature (S106). Next, a present oil temperature value is determined (S107).

In this disclosure, there is shown and described only the preferred embodiment of the invention, but, as aforementioned, it is to be understood that the invention is capable of use in various other combinations and environments and is capable of changes or modification within the scope of the inventive concepts as expressed herein.

What is claimed is:

1. An oil temperature detecting method comprising the steps of:

determining oil temperature from a signal output from an oil temperature sensor in an automatic transmission of a vehicle;

determining a difference in electric potential between automatic transmission and vehicle body grounds;

determining whether the detected oil temperature is within an established standard range if the electric potential difference is above a standard voltage; and calculating present oil temperature and electric potential difference between the automatic transmission and vehicle body grounds if the oil temperature is within the predetermined range.

2. The method of claim 1, wherein if it is determined the electric potential difference is below the standard voltage, the signal from the oil temperature sensor is used as the present oil temperature value.

3. The method of claim 1, wherein if the detected oil temperature is above a standard temperature, the signal from the oil temperature sensor is used as the present oil temperature value.

4. The method of claim 1, wherein the temperature range is set at low temperatures.

5. The method of claim 1, wherein the temperature range is between 0° C. and 80° C.

6. The method of claim 4, wherein the temperature range is between 0° C. and 80° C.

7. An oil temperature detecting system, comprising:

an oil temperature sensor sensing an oil temperature in an automatic transmission of a vehicle;

a controller receiving signals indicating a first potential and a second potential, the first potential being a potential of a ground for the automatic transmission and the second potential being a potential of a ground for a body of the vehicle, the controller controlling operation of the automatic transmission based on the sensed oil temperature and the first and second potentials.

8. The system of claim 7, wherein the controller calculates a difference between the first and second potentials, and controls the operation of the automatic transmission based on the sensed oil temperature and the calculated difference.

9. The system of claim 8, wherein the controller determines if an absolute value of the calculated difference is greater than a standard voltage, and controls the operation of the automatic transmission based on the sensed oil temperature and a result of the determination.

10. An oil temperature detecting method, comprising:

sensing an oil temperature in an automatic transmission of a vehicle;

receiving, at a controller, first and second signals indicating a first potential and a second potential, respectively, the first potential being a potential of a ground for the automatic transmission, the second potential being a potential of a ground for a body of the vehicle; and controlling operation of the automatic transmission based on the sensed oil temperature and the first and second potentials.

11. The method of claim 10, wherein the controlling step includes the substep of calculating a difference between the first and second potentials, and the controlling step controls the operation of the automatic transmission based on the sensed oil temperature and the calculated difference.

12. The method of claim 11, wherein the controlling further includes the substep of determining if an absolute value of the calculated difference is greater than standard voltage, and the controlling step controls the operation of the automatic transmission based on the sensed oil temperature and a result of the determination.

* * * * *